(12) United States Patent
Langhammer

(10) Patent No.: US 9,098,332 B1
(45) Date of Patent: Aug. 4, 2015

(54) SPECIALIZED PROCESSING BLOCK WITH FIXED- AND FLOATING-POINT STRUCTURES

(75) Inventor: Martin Langhammer, Salisbury (GB)

(73) Assignee: Altera Corporation, San Jose, CA (US)

( * ) Notice: Subject to any disclaimer, the term of this patent is extended or adjusted under 35 U.S.C. 154(b) by 509 days.

(21) Appl. No.: 13/486,255

(22) Filed: Jun. 1, 2012

(51) Int. Cl.
| | | |
|---|---|---|
| *G06F 7/48* | (2006.01) | |
| *G06F 7/49* | (2006.01) | |
| *G06F 9/30* | (2006.01) | |
| *G06F 7/499* | (2006.01) | |
| *G06F 7/485* | (2006.01) | |

(52) U.S. Cl.
CPC ............ *G06F 7/49947* (2013.01); *G06F 7/485* (2013.01); *G06F 9/30014* (2013.01)

(58) Field of Classification Search
CPC .. G06F 7/485; G06F 7/49947; G06F 9/30014
USPC .................. 708/501, 503, 505, 513, 518, 714
See application file for complete search history.

(56) References Cited

U.S. PATENT DOCUMENTS

| | | |
|---|---|---|
| 3,473,160 A | 10/1969 | Wahlstrom |
| 3,697,734 A | 10/1972 | Booth et al. |
| 3,800,130 A | 3/1974 | Martinson et al. |
| 4,156,927 A | 5/1979 | McElroy et al. |
| 4,179,746 A | 12/1979 | Tubbs |
| 4,212,076 A | 7/1980 | Conners |
| 4,215,406 A | 7/1980 | Gomola et al. |
| 4,215,407 A | 7/1980 | Gomola et al. |
| 4,422,155 A | 12/1983 | Amir et al. |
| 4,484,259 A | 11/1984 | Palmer et al. |
| 4,521,907 A | 6/1985 | Amir et al. |
| 4,575,812 A | 3/1986 | Kloker et al. |

(Continued)

FOREIGN PATENT DOCUMENTS

| | | |
|---|---|---|
| EP | 0 158 430 | 10/1985 |
| EP | 0 380 456 | 8/1990 |

(Continued)

OTHER PUBLICATIONS

Xilinx, Inc., "Implementing Barrel Shifters Using Multipliers," p. 1-4, Aug. 17, 2004.

(Continued)

*Primary Examiner* — Chuong D Ngo
(74) *Attorney, Agent, or Firm* — Ropes & Gray LLP; Jeffrey H. Ingerman

(57) ABSTRACT

Circuitry for performing arithmetic operations on a plurality of inputs efficiently performs both fixed-point operations and floating-point operations. Each of at least first and second respective operator circuits operates on a respective subplurality of the plurality of inputs. Other circuitry selectively interconnects the respective operator circuits so that they can operate together or separately, according to user selection, on selected ones of (a) the full plurality of inputs, (b) individual ones of the respective subpluralities of the plurality of inputs, or (c) combinations of portions of the respective subpluralities of the plurality of inputs. At least one of the respective operator circuits includes circuits for simultaneously computing multiple different results and for selecting among the multiple different results based on an output of another one of the respective operator circuits. One or more of the multiple different results are selectably usable to perform both fixed-point operations and floating-point operations.

19 Claims, 5 Drawing Sheets

(56) References Cited

U.S. PATENT DOCUMENTS

| | | |
|---|---|---|
| 4,597,053 A | 6/1986 | Chamberlin |
| 4,616,330 A | 10/1986 | Betz |
| 4,623,961 A | 11/1986 | Mackiewicz |
| 4,682,302 A | 7/1987 | Williams |
| 4,718,057 A | 1/1988 | Venkitakrishnan et al. |
| 4,727,508 A | 2/1988 | Williams |
| 4,736,335 A | 4/1988 | Barban |
| 4,754,421 A | 6/1988 | Bosshart |
| 4,791,590 A | 12/1988 | Ku et al. |
| 4,799,004 A | 1/1989 | Mori |
| 4,823,260 A | 4/1989 | Imel et al. |
| 4,823,295 A | 4/1989 | Mader |
| 4,839,847 A | 6/1989 | Laprade |
| 4,871,930 A | 10/1989 | Wong et al. |
| 4,893,268 A * | 1/1990 | Denman et al. ............... 708/627 |
| 4,908,788 A | 3/1990 | Fujiyama |
| 4,912,345 A | 3/1990 | Steele et al. |
| 4,918,637 A | 4/1990 | Morton |
| 4,967,160 A | 10/1990 | Quievy et al. |
| 4,982,354 A | 1/1991 | Takeuchi et al. |
| 4,991,010 A | 2/1991 | Hailey et al. |
| 4,994,997 A | 2/1991 | Martin et al. |
| 4,999,803 A | 3/1991 | Turrini et al. |
| 5,073,863 A | 12/1991 | Zhang |
| 5,081,604 A | 1/1992 | Tanaka |
| 5,122,685 A | 6/1992 | Chan et al. |
| 5,128,559 A | 7/1992 | Steele |
| 5,175,702 A | 12/1992 | Beraud et al. |
| 5,208,491 A | 5/1993 | Ebeling et al. |
| RE34,363 E | 8/1993 | Freeman |
| 5,267,187 A | 11/1993 | Hsieh et al. |
| 5,296,759 A | 3/1994 | Sutherland et al. |
| 5,338,983 A | 8/1994 | Agarwala |
| 5,339,263 A | 8/1994 | White |
| 5,349,250 A | 9/1994 | New |
| 5,357,152 A | 10/1994 | Jennings, III et al. |
| 5,371,422 A | 12/1994 | Patel et al. |
| 5,373,461 A | 12/1994 | Bearden et al. |
| 5,375,079 A | 12/1994 | Uramoto et al. |
| 5,381,357 A | 1/1995 | Wedgwood et al. |
| 5,404,324 A | 4/1995 | Colon-Benet |
| 5,424,589 A | 6/1995 | Dobbelaere et al. |
| 5,446,651 A | 8/1995 | Moyse et al. |
| 5,451,948 A | 9/1995 | Jekel |
| 5,452,231 A | 9/1995 | Butts et al. |
| 5,452,375 A | 9/1995 | Rousseau et al. |
| 5,457,644 A | 10/1995 | McCollum |
| 5,465,226 A | 11/1995 | Goto |
| 5,465,375 A | 11/1995 | Thepaut et al. |
| 5,483,178 A | 1/1996 | Costello et al. |
| 5,497,498 A | 3/1996 | Taylor |
| 5,500,812 A | 3/1996 | Saishi et al. |
| 5,500,828 A | 3/1996 | Doddington et al. |
| 5,523,963 A | 6/1996 | Hsieh et al. |
| 5,528,550 A | 6/1996 | Pawate et al. |
| 5,537,601 A | 7/1996 | Kimura et al. |
| 5,541,864 A | 7/1996 | Van Bavel et al. |
| 5,546,018 A | 8/1996 | New et al. |
| 5,550,993 A | 8/1996 | Ehlig et al. |
| 5,559,450 A | 9/1996 | Ngai et al. |
| 5,563,526 A | 10/1996 | Hastings et al. |
| 5,563,819 A | 10/1996 | Nelson |
| 5,570,039 A | 10/1996 | Oswald et al. |
| 5,570,040 A | 10/1996 | Lytle et al. |
| 5,572,148 A | 11/1996 | Lytle et al. |
| 5,581,501 A | 12/1996 | Sansbury et al. |
| 5,590,350 A | 12/1996 | Guttag et al. |
| 5,594,366 A | 1/1997 | Khong et al. |
| 5,594,912 A | 1/1997 | Brueckmann et al. |
| 5,596,763 A | 1/1997 | Guttag et al. |
| 5,606,266 A | 2/1997 | Pedersen |
| 5,617,058 A | 4/1997 | Adrian et al. |
| 5,631,848 A | 5/1997 | Laczko et al. |
| 5,631,859 A | 5/1997 | Markstein et al. |
| 5,633,601 A | 5/1997 | Nagaraj |
| 5,636,150 A | 6/1997 | Okamoto |
| 5,636,368 A | 6/1997 | Harrison et al. |
| 5,640,578 A | 6/1997 | Balmer et al. |
| 5,644,519 A | 7/1997 | Yatim et al. |
| 5,644,522 A | 7/1997 | Moyse et al. |
| 5,646,545 A | 7/1997 | Trimberger et al. |
| 5,646,875 A | 7/1997 | Taborn et al. |
| 5,648,732 A | 7/1997 | Duncan |
| 5,652,903 A | 7/1997 | Weng et al. |
| 5,655,069 A | 8/1997 | Ogawara et al. |
| 5,664,192 A | 9/1997 | Lloyd et al. |
| 5,689,195 A | 11/1997 | Cliff et al. |
| 5,696,708 A | 12/1997 | Leung |
| 5,729,495 A | 3/1998 | Madurawe |
| 5,740,404 A | 4/1998 | Baji |
| 5,744,980 A | 4/1998 | McGowan et al. |
| 5,744,991 A | 4/1998 | Jefferson et al. |
| 5,754,459 A | 5/1998 | Telikepalli |
| 5,761,483 A | 6/1998 | Trimberger |
| 5,764,555 A | 6/1998 | McPherson et al. |
| 5,768,613 A | 6/1998 | Asghar |
| 5,771,186 A | 6/1998 | Kodali et al. |
| 5,777,912 A | 7/1998 | Leung et al. |
| 5,784,636 A | 7/1998 | Rupp |
| 5,790,446 A | 8/1998 | Yu et al. |
| 5,794,067 A | 8/1998 | Kadowaki |
| 5,801,546 A | 9/1998 | Pierce et al. |
| 5,805,477 A | 9/1998 | Perner |
| 5,805,913 A | 9/1998 | Guttag et al. |
| 5,808,926 A | 9/1998 | Gorshtein et al. |
| 5,812,479 A | 9/1998 | Cliff et al. |
| 5,812,562 A | 9/1998 | Baeg |
| 5,815,422 A | 9/1998 | Dockser |
| 5,821,776 A | 10/1998 | McGowan |
| 5,825,202 A | 10/1998 | Tavana et al. |
| 5,838,165 A | 11/1998 | Chatter |
| 5,841,684 A | 11/1998 | Dockser |
| 5,847,579 A | 12/1998 | Trimberger |
| 5,847,978 A | 12/1998 | Ogura et al. |
| 5,847,981 A | 12/1998 | Kelley et al. |
| 5,859,878 A | 1/1999 | Phillips et al. |
| 5,869,979 A | 2/1999 | Bocchino |
| 5,872,380 A | 2/1999 | Rostoker et al. |
| 5,874,834 A | 2/1999 | New |
| 5,878,250 A | 3/1999 | LeBlanc |
| 5,880,981 A | 3/1999 | Kojima et al. |
| 5,892,962 A | 4/1999 | Cloutier |
| 5,894,228 A | 4/1999 | Reddy et al. |
| 5,898,602 A | 4/1999 | Rothman et al. |
| 5,931,898 A | 8/1999 | Khoury |
| 5,942,914 A | 8/1999 | Reddy et al. |
| 5,944,774 A | 8/1999 | Dent |
| 5,949,710 A | 9/1999 | Pass et al. |
| 5,951,673 A | 9/1999 | Miyata |
| 5,956,265 A | 9/1999 | Lewis |
| 5,959,871 A | 9/1999 | Pierzchala et al. |
| 5,960,193 A | 9/1999 | Guttag et al. |
| 5,961,635 A | 10/1999 | Guttag et al. |
| 5,963,048 A | 10/1999 | Harrison et al. |
| 5,963,050 A | 10/1999 | Young et al. |
| 5,968,196 A | 10/1999 | Ramamurthy et al. |
| 5,970,254 A | 10/1999 | Cooke et al. |
| 5,978,260 A | 11/1999 | Trimberger et al. |
| 5,982,195 A | 11/1999 | Cliff et al. |
| 5,986,465 A | 11/1999 | Mendel |
| 5,991,788 A | 11/1999 | Mintzer |
| 5,991,898 A | 11/1999 | Rajski et al. |
| 5,995,748 A | 11/1999 | Guttag et al. |
| 5,999,015 A | 12/1999 | Cliff et al. |
| 5,999,990 A | 12/1999 | Sharrit et al. |
| 6,005,806 A | 12/1999 | Madurawe et al. |
| 6,006,321 A | 12/1999 | Abbott |
| 6,009,451 A | 12/1999 | Burns |
| 6,018,755 A | 1/2000 | Gonikberg et al. |
| 6,020,759 A | 2/2000 | Heile |
| 6,021,423 A | 2/2000 | Nag et al. |
| 6,029,187 A | 2/2000 | Verbauwhede |
| 6,031,763 A | 2/2000 | Sansbury |
| 6,041,339 A | 3/2000 | Yu et al. |

(56) References Cited

U.S. PATENT DOCUMENTS

| | | |
|---|---|---|
| 6,041,340 A | 3/2000 | Mintzer |
| 6,052,327 A | 4/2000 | Reddy et al. |
| 6,052,755 A | 4/2000 | Terrill et al. |
| 6,052,773 A | 4/2000 | DeHon et al. |
| 6,055,555 A | 4/2000 | Boswell et al. |
| 6,064,614 A | 5/2000 | Khoury |
| 6,065,131 A | 5/2000 | Andrews et al. |
| 6,066,960 A | 5/2000 | Pedersen |
| 6,069,487 A | 5/2000 | Lane et al. |
| 6,072,994 A | 6/2000 | Phillips et al. |
| 6,073,154 A | 6/2000 | Dick |
| 6,075,381 A | 6/2000 | LaBerge |
| 6,084,429 A | 7/2000 | Trimberger |
| 6,085,317 A | 7/2000 | Smith |
| 6,091,261 A | 7/2000 | De Lange |
| 6,091,765 A | 7/2000 | Pietzold, III et al. |
| 6,094,726 A | 7/2000 | Gonion et al. |
| 6,097,988 A | 8/2000 | Tobias |
| 6,098,163 A | 8/2000 | Guttag et al. |
| 6,107,820 A | 8/2000 | Jefferson et al. |
| 6,107,821 A | 8/2000 | Kelem et al. |
| 6,107,824 A | 8/2000 | Reddy et al. |
| 6,108,772 A | 8/2000 | Sharangpani |
| 6,130,554 A | 10/2000 | Kolze et al. |
| 6,140,839 A | 10/2000 | Kaviani et al. |
| 6,144,980 A | 11/2000 | Oberman |
| 6,154,049 A | 11/2000 | New |
| 6,157,210 A | 12/2000 | Zaveri et al. |
| 6,163,788 A | 12/2000 | Chen et al. |
| 6,167,415 A | 12/2000 | Fischer et al. |
| 6,175,849 B1 | 1/2001 | Smith |
| 6,215,326 B1 | 4/2001 | Jefferson et al. |
| 6,226,735 B1 | 5/2001 | Mirsky |
| 6,242,947 B1 | 6/2001 | Trimberger |
| 6,243,729 B1 | 6/2001 | Staszewski |
| 6,246,258 B1 | 6/2001 | Lesea |
| 6,260,053 B1 | 7/2001 | Maulik et al. |
| 6,279,021 B1 | 8/2001 | Takano et al. |
| 6,286,024 B1 | 9/2001 | Yano et al. |
| 6,314,442 B1 | 11/2001 | Suzuki |
| 6,314,551 B1 | 11/2001 | Borland |
| 6,321,246 B1 | 11/2001 | Page et al. |
| 6,323,680 B1 | 11/2001 | Pedersen et al. |
| 6,327,605 B2 | 12/2001 | Arakawa et al. |
| 6,346,824 B1 | 2/2002 | New |
| 6,351,142 B1 | 2/2002 | Abbott |
| 6,353,843 B1 | 3/2002 | Chehrazi et al. |
| 6,359,468 B1 | 3/2002 | Park et al. |
| 6,360,240 B1 | 3/2002 | Takano et al. |
| 6,362,650 B1 | 3/2002 | New et al. |
| 6,366,944 B1 | 4/2002 | Hossain et al. |
| 6,367,003 B1 | 4/2002 | Davis |
| 6,369,610 B1 | 4/2002 | Cheung et al. |
| 6,377,970 B1 | 4/2002 | Abdallah et al. |
| 6,407,576 B1 | 6/2002 | Ngai et al. |
| 6,407,694 B1 | 6/2002 | Cox et al. |
| 6,427,157 B1 | 7/2002 | Webb |
| 6,434,587 B1 | 8/2002 | Liao et al. |
| 6,438,569 B1 | 8/2002 | Abbott |
| 6,438,570 B1 | 8/2002 | Miller |
| 6,446,107 B1 | 9/2002 | Knowles |
| 6,453,382 B1 | 9/2002 | Heile |
| 6,467,017 B1 | 10/2002 | Ngai et al. |
| 6,480,980 B2 | 11/2002 | Koe |
| 6,483,343 B1 | 11/2002 | Faith et al. |
| 6,487,575 B1 | 11/2002 | Oberman |
| 6,523,055 B1 | 2/2003 | Yu et al. |
| 6,523,057 B1 | 2/2003 | Savo et al. |
| 6,531,888 B2 | 3/2003 | Abbott |
| 6,538,470 B1 | 3/2003 | Langhammer et al. |
| 6,542,000 B1 | 4/2003 | Black et al. |
| 6,556,044 B2 | 4/2003 | Langhammer et al. |
| 6,557,092 B1 | 4/2003 | Callen |
| 6,564,238 B1 | 5/2003 | Kim et al. |
| 6,571,268 B1 | 5/2003 | Giacalone et al. |
| 6,573,749 B2 | 6/2003 | New et al. |
| 6,574,762 B1 | 6/2003 | Karimi et al. |
| 6,578,060 B2 | 6/2003 | Chen et al. |
| 6,591,283 B1 | 7/2003 | Conway et al. |
| 6,591,357 B2 | 7/2003 | Mirsky |
| 6,600,495 B1 | 7/2003 | Boland et al. |
| 6,600,788 B1 | 7/2003 | Dick et al. |
| 6,628,140 B2 | 9/2003 | Langhammer et al. |
| 6,687,722 B1 | 2/2004 | Larsson et al. |
| 6,692,534 B1 | 2/2004 | Wang et al. |
| 6,700,581 B2 | 3/2004 | Baldwin et al. |
| 6,725,441 B1 | 4/2004 | Keller et al. |
| 6,728,901 B1 | 4/2004 | Rajski et al. |
| 6,731,133 B1 | 5/2004 | Feng et al. |
| 6,732,134 B1 | 5/2004 | Rosenberg et al. |
| 6,744,278 B1 | 6/2004 | Liu et al. |
| 6,745,254 B2 | 6/2004 | Boggs et al. |
| 6,763,367 B2 | 7/2004 | Kwon et al. |
| 6,771,094 B1 | 8/2004 | Langhammer et al. |
| 6,774,669 B1 | 8/2004 | Liu et al. |
| 6,781,408 B1 | 8/2004 | Langhammer |
| 6,781,410 B2 | 8/2004 | Pani et al. |
| 6,788,104 B2 | 9/2004 | Singh et al. |
| 6,801,924 B1 | 10/2004 | Green et al. |
| 6,836,839 B2 | 12/2004 | Master et al. |
| 6,874,079 B2 | 3/2005 | Hogenauer |
| 6,889,238 B2 | 5/2005 | Johnson |
| 6,904,471 B2 | 6/2005 | Boggs et al. |
| 6,915,322 B2 | 7/2005 | Hong |
| 6,924,663 B2 | 8/2005 | Masui et al. |
| 6,963,890 B2 | 11/2005 | Dutta et al. |
| 6,971,083 B1 | 11/2005 | Farrugia et al. |
| 6,978,287 B1 | 12/2005 | Langhammer |
| 6,983,300 B2 | 1/2006 | Ferroussat |
| 7,020,673 B2 | 3/2006 | Ozawa |
| 7,024,446 B2 | 4/2006 | Langhammer et al. |
| 7,047,272 B2 | 5/2006 | Giacalone et al. |
| 7,062,526 B1 | 6/2006 | Hoyle |
| 7,093,204 B2 | 8/2006 | Oktem et al. |
| 7,107,305 B2 | 9/2006 | Deng et al. |
| 7,113,969 B1 | 9/2006 | Green et al. |
| 7,181,484 B2 | 2/2007 | Stribaek et al. |
| 7,230,451 B1 | 6/2007 | Langhammer |
| 7,313,585 B2 | 12/2007 | Winterrowd |
| 7,343,388 B1 | 3/2008 | Burney et al. |
| 7,395,298 B2 | 7/2008 | Debes et al. |
| 7,401,109 B2 | 7/2008 | Koc et al. |
| 7,409,417 B2 | 8/2008 | Lou |
| 7,415,542 B2 | 8/2008 | Hennedy et al. |
| 7,421,465 B1 | 9/2008 | Rarick et al. |
| 7,428,565 B2 | 9/2008 | Fujimori |
| 7,428,566 B2 | 9/2008 | Siu et al. |
| 7,430,578 B2 | 9/2008 | Debes et al. |
| 7,430,656 B2 | 9/2008 | Sperber et al. |
| 7,447,310 B2 | 11/2008 | Koc et al. |
| 7,472,155 B2 | 12/2008 | Simkins et al. |
| 7,508,936 B2 | 3/2009 | Eberle et al. |
| 7,536,430 B2 | 5/2009 | Guevokian et al. |
| 7,567,997 B2 | 7/2009 | Simkins et al. |
| 7,590,676 B1 | 9/2009 | Langhammer |
| 7,646,430 B2 | 1/2010 | Brown Elliott et al. |
| 7,650,374 B1 | 1/2010 | Gura et al. |
| 7,668,896 B2 | 2/2010 | Lutz et al. |
| 7,719,446 B2 | 5/2010 | Rosenthal et al. |
| 7,720,898 B2 | 5/2010 | Driker et al. |
| 7,769,797 B2 | 8/2010 | Cho et al. |
| 7,814,136 B1 | 10/2010 | Verma et al. |
| 7,814,137 B1 | 10/2010 | Mauer |
| 7,822,799 B1 | 10/2010 | Langhammer et al. |
| 7,836,117 B1 | 11/2010 | Langhammer et al. |
| 7,865,541 B1 | 1/2011 | Langhammer |
| 7,917,567 B1 | 3/2011 | Mason et al. |
| 7,930,335 B2 | 4/2011 | Gura |
| 7,930,336 B2 | 4/2011 | Langhammer |
| 7,949,699 B1 | 5/2011 | Neoh et al. |
| 8,024,394 B2 | 9/2011 | Prokopenko et al. |
| 8,041,759 B1 | 10/2011 | Langhammer et al. |
| 8,090,758 B1 | 1/2012 | Shimanek et al. |
| 8,112,466 B2 | 2/2012 | Minz et al. |

(56) References Cited

U.S. PATENT DOCUMENTS

| | | | |
|---|---|---|---|
| 8,447,800 | B2 | 5/2013 | Dockser et al. |
| 8,468,191 | B2 | 6/2013 | Mantor et al. |
| 8,595,279 | B2 | 11/2013 | Dockser |
| 8,751,551 | B2 * | 6/2014 | Streicher et al. ............ 708/230 |
| 2001/0023425 | A1 | 9/2001 | Oberman et al. |
| 2001/0029515 | A1 | 10/2001 | Mirsky |
| 2001/0037352 | A1 | 11/2001 | Hong |
| 2002/0002573 | A1 | 1/2002 | Landers et al. |
| 2002/0032713 | A1 | 3/2002 | Jou et al. |
| 2002/0038324 | A1 | 3/2002 | Page et al. |
| 2002/0049798 | A1 | 4/2002 | Wang et al. |
| 2002/0078114 | A1 | 6/2002 | Wang et al. |
| 2002/0089348 | A1 | 7/2002 | Langhammer |
| 2002/0116434 | A1 | 8/2002 | Nancekievill |
| 2002/0143841 | A1 * | 10/2002 | Farooqui et al. ............ 708/710 |
| 2003/0065699 | A1 | 4/2003 | Burns |
| 2003/0088757 | A1 | 5/2003 | Lindner et al. |
| 2004/0064770 | A1 | 4/2004 | Xin |
| 2004/0083412 | A1 | 4/2004 | Corbin et al. |
| 2004/0103133 | A1 | 5/2004 | Gurney |
| 2004/0122882 | A1 | 6/2004 | Zakharov et al. |
| 2004/0148321 | A1 | 7/2004 | Guevorkian et al. |
| 2004/0172439 | A1 | 9/2004 | Lin |
| 2004/0178818 | A1 | 9/2004 | Crotty et al. |
| 2004/0193981 | A1 | 9/2004 | Clark et al. |
| 2004/0267857 | A1 | 12/2004 | Abel et al. |
| 2004/0267863 | A1 | 12/2004 | Bhushan et al. |
| 2005/0038842 | A1 | 2/2005 | Stoye |
| 2005/0120122 | A1 | 6/2005 | Farnham |
| 2005/0144212 | A1 | 6/2005 | Simkins et al. |
| 2005/0144215 | A1 | 6/2005 | Simkins et al. |
| 2005/0144216 | A1 | 6/2005 | Simkins et al. |
| 2005/0166038 | A1 | 7/2005 | Wang et al. |
| 2005/0187997 | A1 | 8/2005 | Zheng et al. |
| 2005/0187999 | A1 | 8/2005 | Zheng et al. |
| 2005/0262175 | A1 | 11/2005 | Iino et al. |
| 2006/0020655 | A1 | 1/2006 | Lin |
| 2006/0112160 | A1 | 5/2006 | Ishii et al. |
| 2007/0083585 | A1 | 4/2007 | St. Denis et al. |
| 2007/0185951 | A1 | 8/2007 | Lee et al. |
| 2007/0185952 | A1 | 8/2007 | Langhammer et al. |
| 2007/0241773 | A1 | 10/2007 | Hutchings et al. |
| 2008/0133627 | A1 | 6/2008 | Langhammer et al. |
| 2008/0159441 | A1 | 7/2008 | Liao et al. |
| 2008/0183783 | A1 | 7/2008 | Tubbs |
| 2009/0083358 | A1 | 3/2009 | Allen |
| 2009/0113186 | A1 | 4/2009 | Kato et al. |
| 2009/0172052 | A1 | 7/2009 | DeLaquil et al. |
| 2009/0182795 | A1 | 7/2009 | Dobbek et al. |
| 2009/0187615 | A1 | 7/2009 | Abe et al. |
| 2009/0228689 | A1 | 9/2009 | Muff et al. |
| 2009/0292750 | A1 | 11/2009 | Reyzin et al. |
| 2009/0300088 | A1 | 12/2009 | Michaels et al. |
| 2009/0300323 | A1 * | 12/2009 | Hessel et al. ............ 712/7 |
| 2010/0098189 | A1 | 4/2010 | Oketani |
| 2010/0146022 | A1 | 6/2010 | Swartzlander et al. |
| 2010/0191939 | A1 | 7/2010 | Muff et al. |
| 2011/0106868 | A1 | 5/2011 | Lutz |
| 2011/0137970 | A1 | 6/2011 | Dockser et al. |
| 2011/0161389 | A1 | 6/2011 | Langhammer et al. |
| 2011/0219052 | A1 | 9/2011 | Langhammer |
| 2011/0238720 | A1 | 9/2011 | Langhammer |
| 2011/0320513 | A1 | 12/2011 | Langhammer |
| 2012/0054254 | A1 | 3/2012 | Langhammer |
| 2012/0054256 | A1 | 3/2012 | Langhammer |
| 2012/0166512 | A1 | 6/2012 | Wong et al. |
| 2013/0138711 | A1 * | 5/2013 | Sugisawa ............ 708/503 |
| 2014/0067895 | A1 | 3/2014 | Wang |
| 2014/0089371 | A1 | 3/2014 | De Dinechin et al. |

FOREIGN PATENT DOCUMENTS

| | | |
|---|---|---|
| EP | 0 411 491 | 2/1991 |
| EP | 0 419 105 | 3/1991 |
| EP | 0 461 798 | 12/1991 |
| EP | 0 498 066 | 8/1992 |
| EP | 0 555 092 | 8/1993 |
| EP | 0 606 653 | 7/1994 |
| EP | 0 657 803 | 6/1995 |
| EP | 0 660 227 | 6/1995 |
| EP | 0 668 659 | 8/1995 |
| EP | 0 721 159 | 7/1996 |
| EP | 0 905 906 | 3/1999 |
| EP | 0 909 028 | 4/1999 |
| EP | 0 927 393 | 7/1999 |
| EP | 0 992 885 | 4/2000 |
| EP | 1 031 934 | 8/2000 |
| EP | 1 058 185 | 12/2000 |
| EP | 1 220 108 | 7/2002 |
| GB | 2 283 602 | 5/1995 |
| GB | 2 286 737 | 8/1995 |
| GB | 2 318 198 | 4/1998 |
| JP | 61-237133 | 10/1986 |
| JP | 63-216131 | 8/1988 |
| JP | 4-332036 | 11/1992 |
| JP | 5-134851 | 6/1993 |
| JP | 06-187129 | 7/1994 |
| JP | 7-135447 | 5/1995 |
| JP | 11-296345 | 10/1999 |
| JP | 2000-259394 | 9/2000 |
| JP | 2002-108606 | 4/2002 |
| JP | 2002-251281 | 9/2002 |
| WO | WO95-27243 | 10/1995 |
| WO | WO96-28774 | 9/1996 |
| WO | WO97-08606 | 3/1997 |
| WO | WO98-12629 | 3/1998 |
| WO | WO98-32071 | 7/1998 |
| WO | WO98-38741 | 9/1998 |
| WO | WO99-22292 | 5/1999 |
| WO | WO99-31574 | 6/1999 |
| WO | WO99-56394 | 11/1999 |
| WO | WO00-51239 | 8/2000 |
| WO | WO00-52824 | 9/2000 |
| WO | WO01-13562 | 2/2001 |
| WO | WO 2005/066832 | 7/2005 |
| WO | WO2005-101190 | 10/2005 |

OTHER PUBLICATIONS

Altera, "DSP Blocks in Stratix III Devices", Chapter 5, pp. 1-42, Mar. 2010.

Karlström, P., et al., "High Performance, Low Latency FPGA based Floating Point Adder and Multiplier Units in a Virtex 4," Norchip Conf., pp. 31-34, 2006.

Thapliyal, H., et al., "Combined Integer and Floating Point Multiplication Architecture (CIFM) for FPGSs and Its Reversible Logic Implementation", *Proceedings MWSCAS 2006*, Puerto Rico, 5 pages, Aug. 2006.

Thapliyal, H., et al., "Combined Integer and Variable Precision (CIVP) Floating Point Multiplication Architecture for FPGAs", *Proceedings of the 2007 International Conference on Parallel and Distributed Processing Techniques and Applications (PDPTA'07)*, Las Vegas, US, vol. 1, pp. 449-450, Jun. 2007.

Xilinx, Inc., "Virtex-5 ExtremeDSP Design Considerations," *User Guide UG193*, v2.6, 114 pages, Oct. 2007.

Altera Corporation, "Statix II Device Handbook, Chapter 6—DSP Blocks in Stratix II Devices," v1.1, Jul. 2004.

Altera Corporation, "Digital Signal Processing (DSP)," *Stratix Device Handbook*, vol. 2, Chapter 6 and Chapter 7, v1.1 (Sep. 2004).

Altera Corporation, "DSP Blocks in Stratix II and Stratix II GX Devices," *Stratix II Device Handbook*, vol. 2, Chapter 6, v4.0 (Oct. 2005).

Altera Corporation, "FIR Compiler: MegaCore® Function User Guide," version 3.3.0, rev. 1, pp. 3 11 through 3 15 (Oct. 2005).

Altera Corporation, "Advanced Synthesis Cookbook: A Design Guide for Stratix II, Stratix III and Stratix IV Devices," Document Version 3.0, 112 pgs., May 2008.

Amos, D., "Pld architectures match DSP algorithms," *Electronic Product Design*, vol. 17, No. 7, Jul. 1996, pp. 30, 32.

Analog Devices, Inc., The Applications Engineering Staff of Analog Devices, DSP Division, *Digital Signal Processing Applications Using the ADSP-2100 Family* (edited by Amy Mar), 1990, pp. 141-192).

(56) References Cited

OTHER PUBLICATIONS

Andrejas, J., et al., "Reusable DSP functions in FPGAs," *Field-Programmable Logic and Applications. Roadmap to Reconfigurable Computing. 10th International Conference, FPL 2000. Proceedings (Lecture Notes in Computer Science vol. 1896)*, Aug. 27-30, 2000, pp. 456-461.

Aoki, T., "Signed-weight arithmetic and its application to a field-programmable digital filter architecture," *IEICE Transactions on Electronics*, 1999, vol. E82C, No. 9, Sep. 1999, pp. 1687-1698.

Ashour, M.A., et al., "An FPGA implementation guide for some different types of serial-parallel multiplier-structures," *Microelectronics Journal*, vol. 31, No. 3, 2000, pp. 161-168.

Berg, B.L., et al."Designing Power and Area Efficient Multistage FIR Decimators with Economical Low Order Filters," *ChipCenter Technical Note*, Dec. 2001.

Bursky, D., "Programmable Logic Challenges Traditional ASIC SoC Designs", *Electronic Design*, Apr. 15, 2002.

Chhabra, A. et al., Texas Instruments Inc., "A Block Floating Point Implementation on the TMS320C54x DSP", Application Report SPRA610, Dec. 1999, pp. 1-10.

Colet, P., "When DSPs and FPGAs meet: Optimizing image processing architectures," *Advanced Imaging*, vol. 12, No. 9, Sep. 1997, pp. 14, 16, 18.

Crookes, D., et al., "Design and implementation of a high level programming environment for FPGA-based image processing," *IEE Proceedings-Vision, Image and Signal Processing*, vol. 147, No. 4, Aug. 2000, pp. 377-384.

Debowski, L., et al., "A new flexible architecture of digital control systems based on DSP and complex CPLD technology for power conversion applications," *PCIM 2000: Europe Official Proceedings of the Thirty-Seventh International Intelligent Motion Conference*, Jun. 6-8, 2000, pp. 281-286.

de Dinechin, F. et al., "Large multipliers with less DSP blocks," retrieved from http://hal-ens-lyon.archives-ouvertes.fr/ensl-00356421/en/, 9 pgs., available online Jan. 2009.

Dick, C., et al., "Configurable logic for digital communications: some signal processing perspectives," IEEE Communications Magazine, vol. 37, No. 8, Aug. 1999, pp. 107-111.

Do, T.-T., et al., "A flexible implementation of high-performance FIR filters on Xilinx FPGAs," *Field-Programmable Logic and Applications: From FPGAs to Computing Paradigm. 8th International Workshop, FPL '98. Proceedings*, Hartenstein, R.W., et al., eds., Aug. 31-Sep. 3, 1998, pp. 441-445.

Gaffer, A.A., et al., "Floating-Point Bitwidth Analysis via Automatic Differentiation," *IEEE Conference on Field Programmable Technology*, Hong Kong, Dec. 2002.

Govindu, G. et al., "A Library of Parameterizable Floating-Point Cores for FPGAs and Their Application to Scientific Computing," *Proc Int'l Conf. Eng. Reconfigurable Systems and Algorithms (ERSA'05)*, Jun. 2005.

Govindu, G. et al., "Analysis of High-performance Floating-point Arithmetic on FPGAs," *Proceedings of the 18th International Parallel and Distributed Processing Symposium (PDPS'04)* pp. 149-156, Apr. 2004.

Guccione, S.A.,"Run-time Reconfiguration at Xilinx," *Parallel and distributed processing: 15 IPDPS 2000 workshops*, Rolim, J., ed., May 1-5, 2000, p. 873.

Hauck, S., "The Future of Reconfigurable Systems," *Keynote Address, 5th Canadian Conference on Field Programmable Devices*, Jun. 1998, http:--www.ee.washington.edu-people-faculty-hauck-publications-ReconfigFuture.PDF.

Haynes, S.D., et al., "Configurable multiplier blocks for embedding in FPGAs," *Electronicas Letters*, vol. 34, No. 7, pp. 638-639 (Apr. 2, 1998).

Heysters, P.M., et al., "Mapping of DSP algorithms on field programmable function arrays," *Field-Programmable Logic and Applications. Roadmap to Reconfigurable Computing. 10th International Conference, FPL 2000 Proceedings (Lecture Notes in Computer Science vol. 1896)*, Aug. 27-30, 2000, pp. 400-411.

Huang, J., et al., "Simulated Performance of 1000BASE-T Receiver with Different Analog Front End Designs," *Proceedings of the 35th Asilomar Conference on Signals, Systems, and Computers*, Nov. 4-7, 2001.

Lattice Semiconductor Corp, *ORCA® FPGA Express™ Interface Manual: ispLEVER® Version 3.0*, 2002.

Lucent Technologies, Microelectronics Group,"Implementing and Optimizing Multipliers in ORCA™ FPGAs,", Application Note. AP97-008FGPA, Feb. 1997.

"Implementing Multipliers in FLEX 10K EABs", *Altera*, Mar. 1996.

"Implementing Logic with the Embedded Array in FLEX 10K Devices", *Altera*, May 2001, ver. 2.1.

Jinghua Li, "Design a pocket multi-bit multiplier in FPGA," *1996 2nd International Conference on ASIC Proceedings (IEEE Cat. No. 96TH8140)*, Oct. 21-24, 1996, pp. 275-279.

Jones, G., "Field-programmable digital signal conditioning," *Electronic Product Design*, vol. 21, No. 6, Jun. 2000, pp. C36-C38.

Kiefer, R., et al., "Performance comparison of software-FPGA hardware partitions for a DSP application," *14th Australian Microelectronics Conference. Microelectronics: Technology Today for the Future. MICRO '97 Proceedings*, Sep. 28-Oct. 1, 1997, pp. 88-93.

Kim, Y., et al., "Fast GPU Implementation for the Solution of Tridiagonal Matrix Systems," *Journal of Korean Institute of Information Scientists and Engineers*, vol. 32, No. 12, pp. 692-704, Dec. 2005.

Kramberger, I., "DSP acceleration using a reconfigurable FPGA," *ISIE '99. Proceedings of the IEEE International Symposium on Industrial Electronics (Cat. No. 99TH8465)*, vol. 3, Jul. 12-16, 1999, pp. 1522-1525.

Langhammer, M., "How to implement DSP in programmable logic " *Elettronica Oggi*, No. 266, Dec. 1998, pp. 113-115.

Langhammer, M., "Implementing a DSP in Programmable Logic " *Online EE Times*, May 1998, http:--www.eetimes.com-editorial-1998-coverstory9805.html.

Lazaravich, B.V., "Function block oriented field programmable logic arrays," *Motorola, Inc. Technical Developments*, vol. 18, Mar. 1993, pp. 10-11.

Lund, D., et al., "A new development system for reconfigurable digital signal processing," First International Conference on 3G Mobile Communication Technologies (Conf. Publ. No. 471), Mar. 27-29, 2000, pp. 306-310.

Miller, N.L., et al., "Reconfigurable integrated circuit for high performance computer arithmetic," *Proceedings of the 1998 IEEE Colloquium on Evolvable Hardware Systems (Digest)* No. 233, 1998, pp. 2-1-2-4.

Mintzer, L., "Xilinx FPGA as an FFT processor," *Electronic Engineering*, vol. 69, No. 845, May 1997, pp. 81, 82, 84.

Faura et al., "A Novel Mixed Signal Programmable Device With On-Chip Microprocessor," Custom Integrated Circuits Conference, 1997. Proceedings of the IEEE 1997 Santa Clara, CA, USA, May 5, 1997, pp. 103-106.

Nakasato, N., et al., "Acceleration of Hydrosynamical Simulations using a FPGA board" *The Institute of Electronics Information and Communication Technical Report CPSY2005-47*, vol. 105, No. 515, Jan. 17, 2006.

Nozal, L., et al., "A new vision system: programmable logic devices and digital signal processor architecture (PLD+DSP)," *Proceedings IECON '91. 1991 International Conference on Industrial Electronics, Control and Instrumentation (Cat. No. 91CH2976-9)* vol. 3, Oct. 28-Nov. 1, 1991, pp. 2014-2018.

Osana, Y., et al., "Hardware-resource Utilization Analysis on an FPGA-Based Biochemical Simulator ReCSiP", *The Institute of Electronics Information and Communication Technical Report CPSY2005-63*, vol. 105, No. 516, Jan. 18, 2006.

Papenfuss, J.R, et al., "Implementation of a real-time, frequency selective, RF channel simulator using a hybrid DSP-FPGA architecture," *RAWCON 2000: 2000 IEEE Radio and Wireless Conference* (Cat. No. 00EX404), Sep. 10-13, 2000, pp. 135-138.

Parhami, B., "Configurable arithmetic arrays with data-driven control," *34th Asilomar Conference on Signals, Systems and Computers*, vol. 1, 2000, pp. 89-93.

"The QuickDSP Design Guide", Quicklogic, Aug. 2001, revision B.

(56) References Cited

OTHER PUBLICATIONS

"QuickDSP™ Family Data Sheet", *Quicklogic*, Aug. 7, 2001, revision B.

Rangasayee, K., "Complex PLDs let you produce efficient arithmetic designs," *EDN (European Edition)*, vol. 41, No. 13, Jun. 20, 1996, pp. 109, 110, 112, 114, 116.

Rosado, A., et al., "A high-speed multiplier coprocessor unit based on FPGA," *Journal of Electrical Engineering*, vol. 48, No. 11-12, 1997, pp. 298-302.

Santillan-Q., G.F., et al., "Real-time integer convolution implemented using systolic arrays and a digit-serial architecture in complex programmable logic devices," *Proceedings of the Third International Workshop on Design of Mixed-Mode Integrated Circuits and Applications* (Cat. No. 99EX303), Jul. 26-28, 1999, pp. 147-150.

Texas Instruments Inc., "TMS320C54x DSP Reference Set, vol. 1: CPU and Peripherals", Literature No. SPRU131F, Apr. 1999, pp. 2-1 through 2-16 and 4-1 through 4-29.

Tisserand, A., et al., "An on-line arithmetic based FPGA for low power custom computing," *Field Programmable Logic and Applications, 9th International Workshop, FPL '99, Proceedings (Lecture Notes in Computer Science vol. 1673)* Lysaght, P., et al., eds., Aug. 30-Sep. 1, 1999, pp. 264-273.

Tralka, C., " Symbiosis of DSP and PLD," *Elektronik*, vol. 49, No. 14, Jul. 11, 2000, pp. 84-96.

Underwood, K. "FPGAs vs. CPUs: Trends in Peak Floating-Point Performance," *Proceedings of the 2004 ACM-SIGDA 12th International Symposium on Field Programmable Gate Arrays*, pp. 171-180, Feb. 22-24, 2004.

Valls, J., et al., "A Study About FPGA-Based Digital Filters," *Signal Processing Systems*, 1998 SIPS 98, 1998 IEEE Workshop, Oct. 10, 1998, pp. 192-201.

"Virtex-II 1.5V Field-Programmable Gate Arrays", *Xilinx*, Jan. 25, 2001, module 2 of 4.

"Virtex-II 1.5V Field-Programmable Gate Arrays", *Xilinx*, Apr. 2, 2001, module 1 of 4.

"Virtex-II 1.5V Field-Programmable Gate Arrays", *Xilinx*, Apr. 2, 2001, module 2 of 4.

Vladimirova, T. et al., "Floating-Point Mathematical Co-Processor for a Single-Chip On-Board Computer," *MAPLD '03 Conference*, D5, Sep. 2003.

Wajih, E.-H.Y. et al., "Efficient Hardware Architecture of Recursive Karatsuba-Ofman Multiplier," *3rd International Conference on Design and Technology of Integrated Systems in Nanoscale Era*, 6 pgs, Mar. 2008.

Walters, A.L., "A Scaleable FIR Filter Implementation Using 32-bit Floating-Point Complex Arithmetic on ,a FPGA Based Custom Computing Platform," Allison L. Walters, Thesis Submitted to the Faculty of Virginia Polytechnic Institute and State University, Jan. 30, 1998.

Weisstein, E.W., "Karatsuba Multiplication," *MathWorld—A Wolfram Web Resource* (Dec. 9, 2007), accessed Dec. 11, 2007 at http:--mathworld.wolfram.com-KaratsubaMultiplication.html.

Wenzel, L., "Field programmable gate arrays (FPGAs) to replace digital signal processor integrated circuits," *Elektronik*, vol. 49, No. 5, Mar. 7, 2000, pp. 78-86.

"Xilinx Unveils New FPGA Architecture to Enable High-Performance, 10 Million System Gate Designs", *Xilinx*, Jun. 22, 2000.

"Xilinx Announces DSP Algorithms, Tools and Features for Virtex-II Architecture", *Xilinx*, Nov. 21, 2000.

Xilinx Inc., "Virtex-II 1.5V Field-Programmable Gate Arrays", Advance Product Specification, DS031-2 (v1.9), Nov. 29, 2001, Module 2 of 4, pp. 1-39.

Xilinx Inc., "Using Embedded Multipliers", Virtex-II Platform FPGA Handbook, UG002 (v1.3), Dec. 3, 2001, pp. 251-257.

Xilinx, Inc., "A 1D Systolic FIR," copyright 1994-2002, downloaded from http:--www.iro.umontreal.ca-~aboulham-F6221-Xilinx%20A%201D%20systolic%20FIR.htm.

Xilinx, Inc., "The Future of FPGA's," White Paper, available Nov. 14, 2005 for download from http:--www.xilinx.com-prs_rls,5yrwhite.htm.

Xilinx Inc., "XtremeDSP Design Considerations User Guide," v 1.2, Feb. 4, 2005.

Xilinx Inc., "Complex Multiplier v2.0", DS291 Product Specification/Datasheet, Nov. 2004.

Zhou, G. et al., "Efficient and High-Throughput Implementations of AES-GCM on FPGAs," *International Conference on Field-Programmable Technology*, 8 pgs., Dec. 2007.

Martinson, L. et al., "Digital Matched Filtering with Pipelined Floating Point Fast Fourier Transforms (FFT's)," *IEEE Transactions on Acoustics, Speech, and Signal Processing*, vol. ASSP-23, No. 2, pp. 222-234, Apr. 1975.

Fujioka, Y., et al., "240MOPS Reconfigurable Parallel VLSI Processor for Robot Control," Proceedings of the 1992 International Conference on Industrial Electronics, Control, Instrumentation, and Automation: Signal Processing and Systems Control; Intelligent Sensors and Instrumentation, vol. 3, pp. 1385-1390, Nov. 9-13, 1992 All references have been considered.

\* cited by examiner

SPECIALIZED PROCESSING BLOCK WITH FIXED- AND FLOATING-POINT STRUCTURES

FIELD OF THE INVENTION

This invention relates to a programmable integrated circuit device, and particularly to a specialized processing block in a programmable integrated circuit device.

BACKGROUND OF THE INVENTION

Considering a programmable logic device (PLD) as one example of an integrated circuit device, as applications for which PLDs are used increase in complexity, it has become more common to design PLDs to include specialized processing blocks in addition to blocks of generic programmable logic resources. Such specialized processing blocks may include a concentration of circuitry on a PLD that has been partly or fully hardwired to perform one or more specific tasks, such as a logical or a mathematical operation. A specialized processing block may also contain one or more specialized structures, such as an array of configurable memory elements. Examples of structures that are commonly implemented in such specialized processing blocks include: multipliers, arithmetic logic units (ALUs), barrel-shifters, various memory elements (such as FIFO/LIFO/SIPO/RAM/ROM/CAM blocks and register files), AND/NAND/OR/NOR arrays, etc., or combinations thereof.

One particularly useful type of specialized processing block that has been provided on PLDs is a digital signal processing (DSP) block, which may be used to process, e.g., audio signals. Such blocks are frequently also referred to as multiply-accumulate ("MAC") blocks, because they include structures to perform multiplication operations, and sums and/or accumulations of multiplication operations.

For example, PLDs sold by Altera Corporation, of San Jose, Calif., as part of the STRATIX® and ARRIA® families include DSP blocks, each of which includes a plurality of multipliers. Each of those DSP blocks also includes adders and registers, as well as programmable connectors (e.g., multiplexers) that allow the various components of the block to be configured in different ways.

Typically, the arithmetic operators (adders and multipliers) in such specialized processing blocks have been fixed-point operators. If floating-point operators were needed, the user would construct them outside the specialized processing block using general-purpose programmable logic of the device, or using a combination of the fixed-point operators inside the specialized processing block with additional logic in the general-purpose programmable logic.

One impediment to incorporating floating-point operators directly into specialized processing blocks is the need for large addition operations as part of many floating-point operations. For example, floating-point multiplication may require two carry-propagate adders. The carry-propagate adder used in a multiplication operation is an expensive component of the multiplier in terms of both area and latency.

SUMMARY OF THE INVENTION

In accordance with embodiments of the present invention, specialized processing blocks such as the DSP blocks described above may be enhanced by including floating-point addition among the functions available in the DSP block, without increasing the number of carry-propagate adders. This is accomplished, in part, by simultaneously computing a sum, as well as that sum plus 1 (in its least significant bit) and that sum plus 2 (in its least significant bits), and then selecting the appropriate result based on the result of another part of the operation. The same structures, and, in particular, at least the sum and sum-plus-1 computations, may be used for both fixed-point operations and floating-point operations.

An adder circuit capable of both fixed-point addition and floating-point addition may be incorporated into the DSP block, and can be independently accessed, or used in combination with multipliers in the DSP block, or even multipliers in adjacent DSP blocks. A DSP block incorporating a fixed-and-floating-point-capable adder in accordance with the invention remains backward-compatible with fixed-point functionality of known DSP blocks.

Therefore, in accordance with embodiments of the present invention there is provided circuitry for performing arithmetic operations on a plurality of inputs. The circuitry includes at least first and second respective operator circuits. Each of the at least first and second respective operator circuits operates on a respective subplurality of the plurality of inputs. Other circuitry selectively interconnects the at least first and second respective operator circuits so that they can operate together or separately, according to user selection, on selected ones of (a) the full plurality of inputs, (b) individual ones of the respective subpluralities of the plurality of inputs, or (c) combinations of portions of the respective subpluralities of the plurality of inputs. At least one of the respective operator circuits includes circuits for simultaneously computing multiple different results and for selecting among the multiple different results based on an output of another one of the respective operator circuits. One or more of said multiple different results are selectably usable for both fixed-point operations and floating-point operations.

A specialized processing block incorporating the circuitry, and a programmable integrated circuit device incorporating the specialized processing block, are also provided.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which.

DETAILED DESCRIPTION

In a specialized processing block—particularly a DSP block—in accordance with embodiments of the present invention, the adder is decomposed into a prefix structure aligned with both fixed-point and floating-point modes. In known floating-point structures, a carry-propagate adder is used, followed by normalization and then by rounding, which involves a second carry-propagate adder. But according to embodiments of the invention, three floating-point steps can be combined into a single level of carry-propagate adder by calculating different subsets of the carry propagate adder inputs as sum, sum-plus-1, and sum-plus-2. Other subsets of the larger carry-propagate adder are also calculated at the same time. The different subset results can be combined in multiple ways to implement either a floating-point adder or multiplier or multiple different types of fixed-point adder or multiplier combinations. The different subset results can be assembled into the required floating-point or fixed-point values by concatenation, thereby avoiding the need to propagate additional carry values over the subset results to obtain the correct output values.

Figure 1:
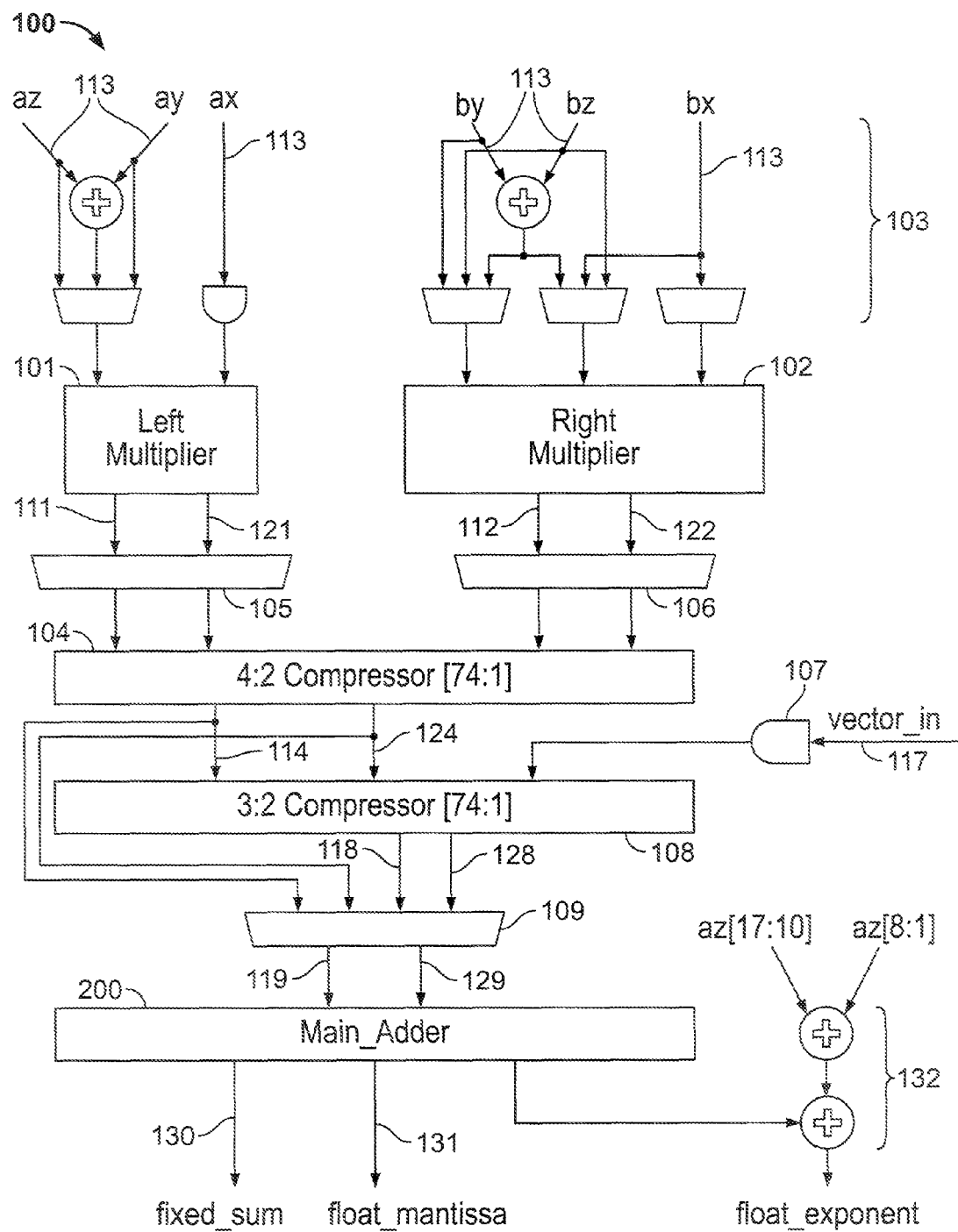
FIG. 1 shows a logical diagram of a multiplier structure of an exemplary DSP block according to an embodiment of the invention for performing either fixed-point or floating-point operations.

FIG. 1 shows a logical diagram of the multiplier structure 100 according to an embodiment of the invention for performing either fixed-point or floating-point operations. In this logical representation, implementational details, such as registers and some programmable routing features—such as multiplexers that may allow the output of a particular structure to be routed around certain components or directly out of a DSP block (when implemented in a DSP block)—are omitted to simplify discussion.

In the logical representation of FIG. 1, the "left multiplier" 101 is a partial product generator such as an 18×18 partial product generator (which may be used, e.g., as two 9×18 partial product generators), which produce two dimensionless output vectors 111, 121. Similarly, the "right multiplier" 102 is a partial product generator such as an 18×18 partial product generator (which may be used, e.g., as a 18×9 partial product generator and a 27×9 partial product generator), which produce two dimensionless output vectors 112, 122. Together, partial product generators 101, 102 can be used as a 27×27 partial product generator, to support single-precision floating-point multiplication, which under the IEEE754-1985 standard has a mantissa size of 23 (exclusive of an implied leading '1'). Input multiplexer stage 103 combines and aligns between four and six inputs 113 according to the needs of a particular user logic design.

The four dimensionless output vectors 111, 112, 121, 122 are combined by 4:2 compressor 104 into two dimensionless output vectors 114, 124. Multiplexers 105, 106 can be used to align vectors 111, 121 and 121, 122, respectively, according to the type of operation being performed, as determined by the user logic design. Specifically, the vectors can be totally offset from one another (e.g., to perform two separate smaller multiplications, such as two 9×9 multiplications), totally aligned with one another (e.g., to perform one larger multiplication, such as one 18×18 multiplication), or partially aligned with one another (e.g., to perform a "rectangular" multiplication, such as a 9×18 multiplication). In one implementation, each of the input and output vectors of compressor 104 may be up to 74 bits wide.

Another vector 117 may be input from another similar block. Vector 117, along with vectors 114, 124 are input to a 3:2 compressor 108 to provide vectors 118, 128. A further multiplexer 109 selects between vectors 114, 124 and vectors 118, 128, allowing compressor 108 to be bypassed if cascade input 117 is not used. AND gate 107 allows input 117 to be zeroed when, for example, the structure is being used in an accumulator mode and the accumulator has to be reset. Output vectors 119, 129, each up to 74 bits wide, are input to adder 200 to provide the resultant product of the multiplication operation, which can be a fixed-point output 130 or a floating-point output 131. In a floating-point case, the exponent may be handled at 132.

When multiplying two floating-point numbers according to the IEEE754-1985 standard, the input multiplicands are normalized numbers between $1.0_{10}$ and $1.\overline{9}_{10}$. Therefore, the resultant product can be between $1.0_{10}$ and $3.\overline{9}_{10}$, and may be subject to normalization and rounding. To accommodate normalization and rounding, it may be necessary to add either zero, 1 or $2_{10}$ to the least significant bit(s) of the result. Specifically, normalization involves a right-shift of 0 bits or 1 bit (if the result greater than or equal to 1.0 and less than $2.0_{10}$, the right-shift is 0 bits; if the result is greater than or equal to $2.0_{10}$ and less than $4.0_{10}$ the right-shift is 1 bit). In cases where rounding is not applied, whether the normalization is 0 bits or 1 bit, the sum-plus-zero (i.e., the sum) may be used. In cases where rounding is applied, then if the normalization is 0 bits, the sum-plus-1 may be used, while if the normalization is 1 bit, the sum-plus-2 may be used. Therefore, in accordance with embodiments of the invention, and as described in more detail below, those three quantities (sum, sum-plus-1 and sum-plus-2) are generated simultaneously using different portions of the circuitry, and then selected using a carry signal from another portion of the calculation. This avoids the need to wait for that other portion of the calculation before generating the appropriate result (sum, sum-plus-1 or sum-plus-2).

In one embodiment, this is accomplished by decomposing adder 200 into three adders—a low adder 201, a middle adder 202 and a high adder 203. Adders 201, 202, 203 can be used together for a single large fixed-point addition (e.g., adding two 74-bit numbers). For other types of additions (which may result from different multiplication operations), adders 201, 202, 203 can be used in different combinations.

Figure 2:
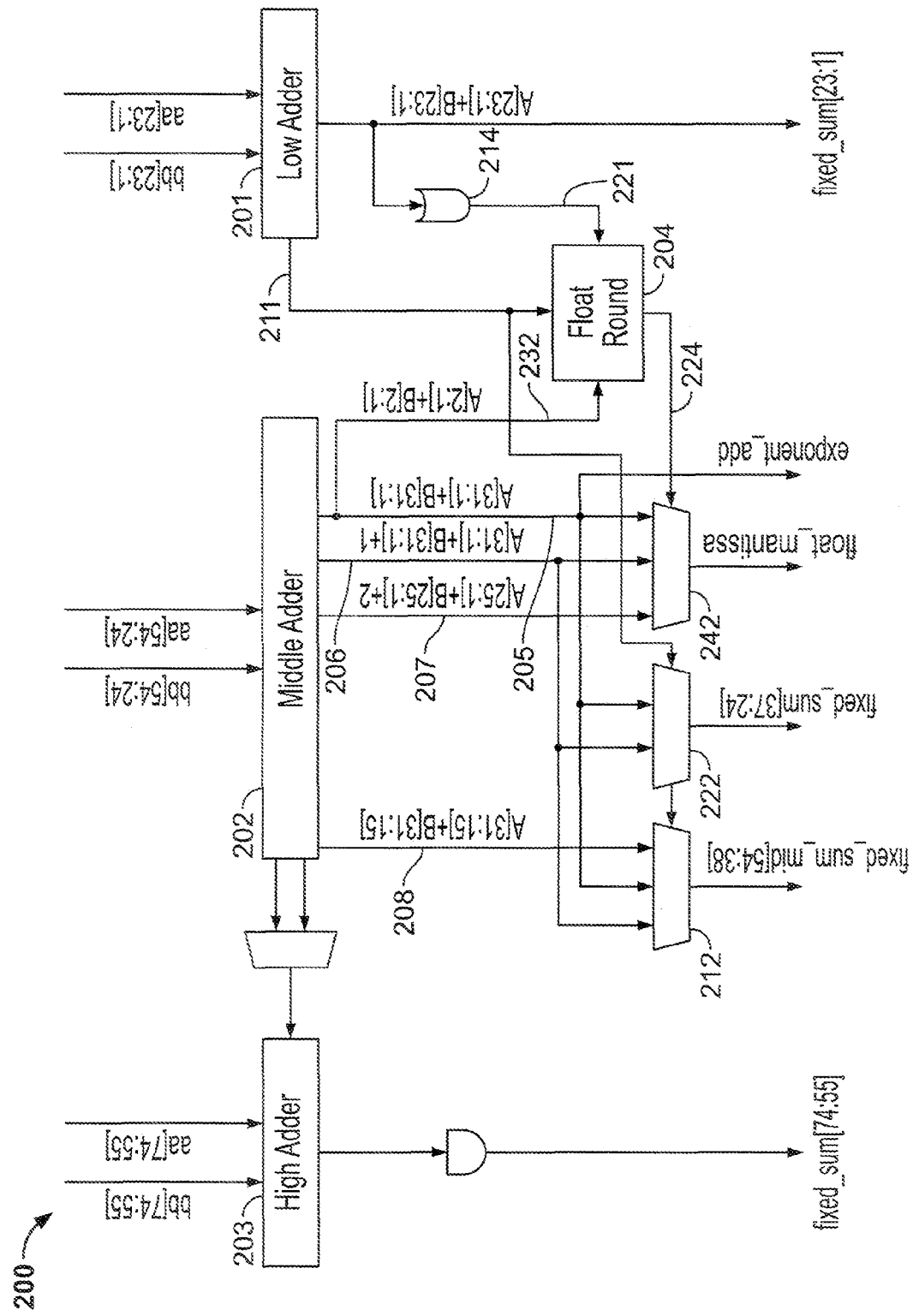
FIG. 2 shows an embodiment of a deconstructed adder in the structure of FIG. 1.

For example, in the example shown in FIG. 2, the inputs of low adder 201 are 23 bits wide, the inputs of adder 202 are 31 bits wide, and the inputs of adder 203 are 20 bits wide. At one extreme, as noted above, adders 201, 202, 203 can be used together to perform a single large fixed-point addition operation (e.g., any addition operation between 55 and 74 bits wide). At the other extreme, adders 201, 202, 203 can be used individually to perform three separate fixed-point addition operations. In between, adders 201, 202, 203 can be used to perform two additions, one or both of which, e.g., may come from separate multipliers. Thus, one addition operation may be performed in low adder 201 and the lower range of middle adder 202, while a second addition operation may be performed in high adder 203 and the upper range of middle adder 202.

When performing two addition operations as just described, each addition operation could be a fixed-point operation. Alternatively, one or both of the two addition operations could be floating-point operations. In the implementation depicted in FIG. 2, the upper addition operation—i.e., the addition operation performed in high adder 230 and the upper range of middle adder 202—would be a fixed-point operation, while the lower addition operation—i.e., the addition operation performed in low adder 201 and the lower range of middle adder 202—could be either a fixed-point operation or a floating-point operation.

Because an addition operation will be spanning the boundary between low adder 201 and middle adder 202, information must be carried across that boundary. As can be seen in FIG. 2, carry information 211 controls multiplexers 212, 222 which, as described in more detail below, are used for fixed-point operations.

In a floating-point context, the location of the least significant bit of the result could actually straddle the boundary—sometimes falling on one side and sometimes falling on the other—depending on the precision and on the particular input values. Information from low adder 201 is needed, along with other information, to establish the location of the least significant bit. Floating-point rounding logic 204 uses the carry information 211, along with the lowermost bits 232 from adder 202 and round-to-nearest-even signal 221 (which combines all but the highest bit from adder 201 in OR-gate 214 to determine the presence of a '1' in any bit location, signifying, when the highest bit from adder 201 is a '1', whether the result from adder 201 is exactly $0.5_{10}$ or greater than $0.5_{10}$) to generate selection signal 224 to select the correct floating-point output using multiplexer 242.

As discussed briefly above, depending on the particular inputs, the correct output from adder 202 may be either the sum of its inputs (205), the sum of its inputs with 1 added to the least significant bit (206), or the sum of its inputs with $2_{10}$ added to the least significant bits (207). In one embodiment, the latter possibility is a possibility only in a floating-point addition, while the other two possibilities are possibilities for either fixed-point addition or floating-point addition. Moreover, where the middle adder 202 is being split between two operations, the upper range output 208 of sum 205 may be output separately.

As also discussed in part above, the selection of the appropriate output(s) from adder 202 is made by multiplexers 212, 222, 242. In the floating-point case, as discussed above, one of sum 205, sum-plus-1 206 and sum-plus-2 207 is selected by multiplexer 242 based on selection signal 224 from floating-point rounding logic 204. In a fixed-point case, multiplexers 212, 222 select between the respective ranges of sum 205 and sum-plus-1 206 based on carry signal 211 from low adder 201 (as noted above, sum plus-2 207 is used only in a floating-point case) or, for multiplexer 212 only, the upper range 208 of the sum.

Figure 3A:
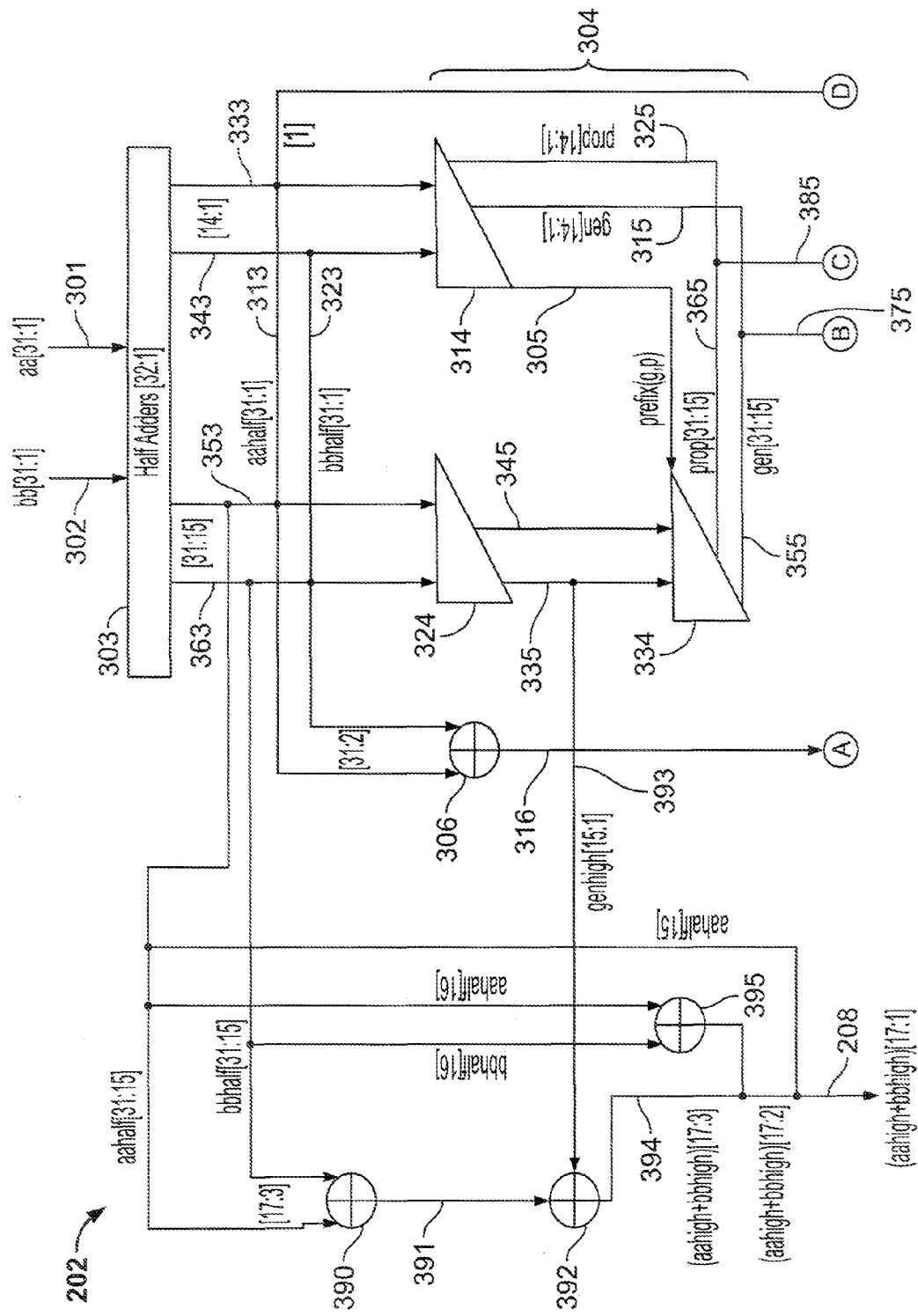
FIGS. 3A and 3B, hereinafter referred to collectively as FIG. 3, show details of one embodiment of one portion of a deconstructed adder such as that of FIG. 2.
Figure 3B:
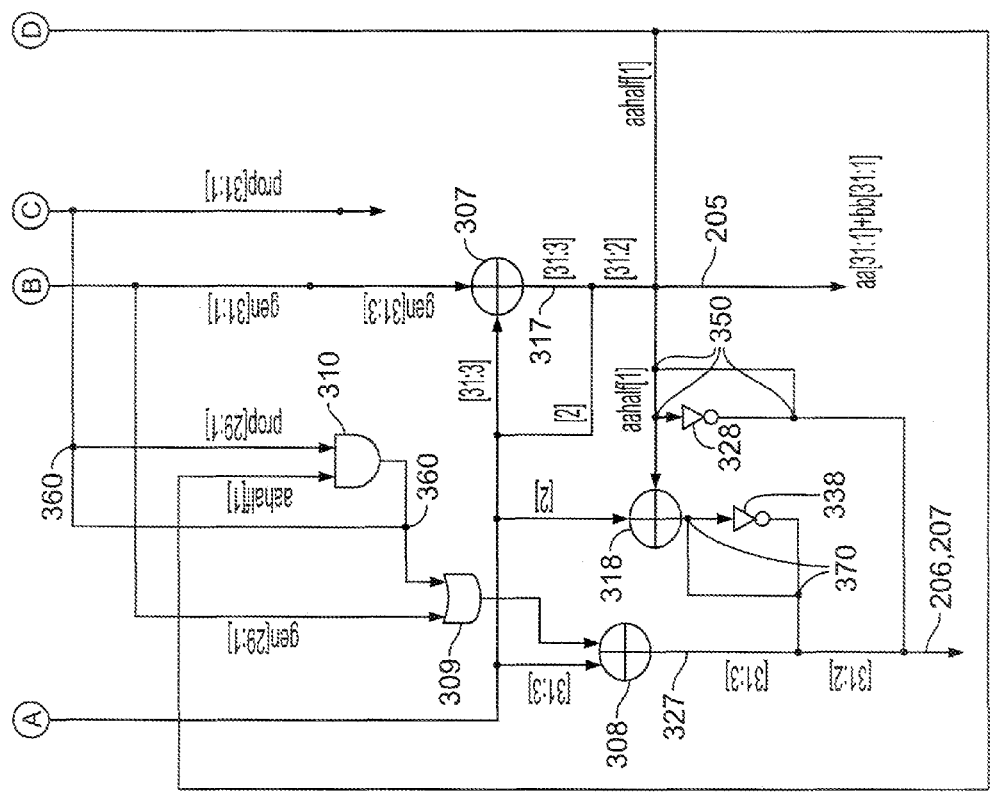

One possible implementation of middle adder 202 is shown in FIG. 3. 31-bit portions 301, 302 of vectors 119, 129 to be added are input to a half-adder 303, which provides two 32-bit vector outputs, which may be referred to as half-add-sum 313 and half-add-carry 323. Half-add-sum vector 313 is the 31-bit result of the bitwise XOR of vector 301 and vector 302; the 32nd bit is not used. Half-add-carry vector 323 is a 32-bit vector resulting from a 1-bit left-shift of the bitwise AND of vector 301 and vector 302, with a '0' inserted in its least-significant bit position (the most significant bit—i.e., bit 32—of vector 323 is used as carry information from adder 202 to adder 203). The output vectors are divided into lower halves 333, 343 and upper halves 353, 363. These half-adder output vectors are input to a parallel prefix network tree 304, which may include three prefix networks 314, 324, 334. Each prefix network may be, for example, a Kogge-Stone prefix network, which outputs respective generate and propagate vectors.

The lower vectors 333, 343 are input to prefix network 314 to provide generate and propagate vectors 315, 325. The upper vectors 353, 363 are input to prefix network 324 to provide generate and propagate vectors 335, 345. Vectors 335, 345 are input to prefix network 334 along with the prefix(g,p) output 305 of the highest node of network 314. Network 334 outputs generate and propagate vectors 355, 365, which are concatenated with generate and propagate vectors 315, 325 to provide generate and propagate vectors 375, 385.

In order to provide sum output 205, bits 31:2 of half-add vectors 313, 323 are XORed at 306 to provide vector 316, bits 31:3 of which are then XORed at 307 with bits 31:3 of concatenated generate vector 375 to provide vector 317. Vector 317 is then concatenated with the least significant bit 326 of vector 316, and then concatenated with the least significant bit of half-add-sum vector 313 to provide sum 205.

In order to provide sum-plus-1 output 206, bits 31:2 of half-add vectors 313, 323 are XORed at 306 to provide vector 316, bits 31:3 of which are then XORed at 308 with the result of ORing (309) bits 29:1 of concatenated generate vector 375, with the result of ANDing (310) bits 29:1 of concatenated propagate vector 385 and the least significant bit of half-add-sum vector 313, to provide vector 327. Vector 327 is then concatenated with the XOR 318 of the least significant bit of half-add-sum vector 313 and the least-significant bit 326 of vector 316, and then concatenated with the inverse 328 (where nodes 350 are controllable to selectably bypass, or not bypass, inverter 328) of the least significant bit of half-add-sum vector 313 to provide sum-plus-1 206.

Outputs 205 and 206 can be used for both fixed-point and floating-point calculations and therefore are computed to 31 bits of precision. However, in some embodiments sum-plus-2 output 207 might only be used for floating-point operations. Because the mantissa in IEEE754-1985 floating-point operations is 23 bits wide, in such an embodiment sum-plus-2 output 207 need only be 25 bits wide (although in other embodiments, output 207 might be 31 bits wide like the other sum outputs). In order to provide a 25-bit-wide sum-plus-2 output 207, bits 25:2 of half-add vectors 313, 323 are XORed at 306 to provide vector 316, bits 25:3 of which are then XORed at 308 with the result of ORing (309) bits 23:1 of concatenated generate vector 375 with bits 23:1 of concatenated propagate vector 385 to provide vector 327 (where nodes 360 are controllable to selectably bypass, or not bypass, adder 310). Vector 327 is then concatenated with inverse 338 (where nodes 370 are controllable to selectably bypass, or not bypass, inverter 338) of the XOR 318 of the least significant bit of half-add-sum vector 313 and the least-significant bit 326 of vector 316, and then concatenated with the least significant bit of half-add-sum vector 313 to provide sum-plus-2 207.

As discussed above, the upper range output 208 of middle adder 202 could be provided separately—e.g., for combining with the output of high adder 203. There are at least two ways to provide upper range output 208.

One way to provide upper range output 208 is to compute sum 205 as described above, but to partition it into upper and lower portions by disconnecting output 305 of prefix network 314 from prefix network 334 and zeroing bit 15 of half-add-carry 323. Upper range output 208 may then be read directly from the upper 17 bits 31:15 of sum 205.

A second way to provide upper range output 208 is to XOR (390) upper bits 31:17 only of upper portions 353, 363 (31:15) of vectors 313, 323 to produce 15-bit vector 391, then to XOR (392) vector 391 with generate vector 393 (which is the least significant bits of the 17 bits of generate vector 335) from prefix network 324 to provide 15-bit vector 394. Vector 394 may be concatenated with the XOR (395) of respective bits 16 of upper portions 353, 363, and that result may be concatenated with the lowest bit (bit 15) of upper portion 353 of half-add-sum 313 to provide 17-bit output 208.

As discussed above, low, middle and high adders 201, 202, 203 may be combined to perform a single fixed-point operation on their combined of inputs. Alternatively, each of low, middle and high adders 201, 202, 203 may perform a separate respective fixed-point operation on its respective inputs. Finally, portions of different ones of low, middle and high adders 201, 202, 203 may be used together to perform separate operations that are selectably fixed-point operations or floating-point operations. Therefore, as described, the decomposed adder structure of FIGS. 2 and 3 can be used to provide, in hardware, both fixed-point addition and floating-point addition, which in turn can support fixed-point and floating-point multiplication operations.

Figure 4:
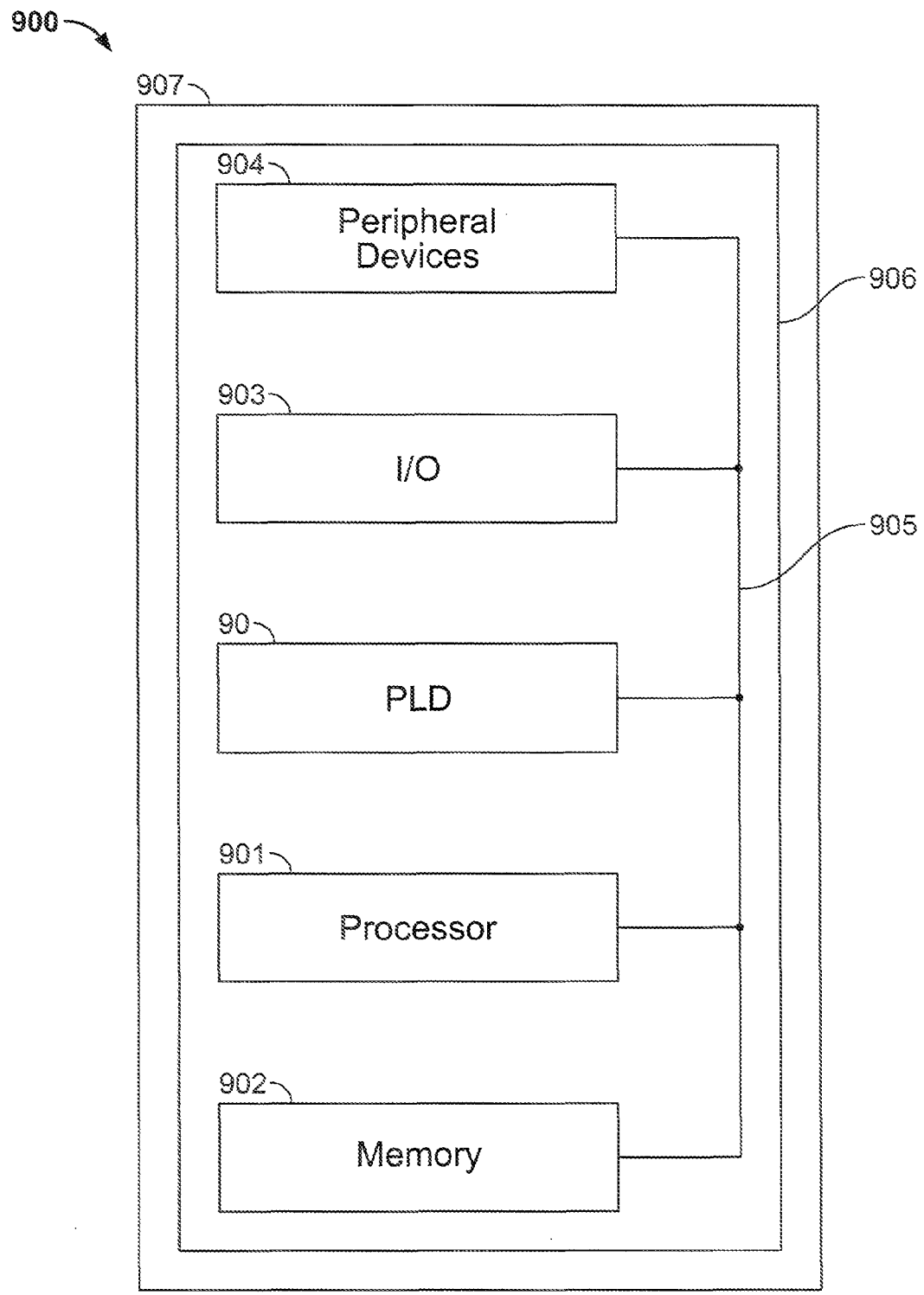
FIG. 4 is a simplified block diagram of an exemplary system employing a programmable logic device incorporating the present invention.

A PLD 90 incorporating specialized processing blocks according to the present invention may be used in many kinds of electronic devices. One possible use is in an exemplary data processing system 900 shown in FIG. 4. Data processing system 900 may include one or more of the following components: a processor 901; memory 902; I/O circuitry 903; and peripheral devices 904. These components are coupled together by a system bus 905 and are populated on a circuit board 906 which is contained in an end-user system 907.

System 900 can be used in a wide variety of applications, such as computer networking, data networking, instrumentation, video processing, digital signal processing, or any other application where the advantage of using programmable or reprogrammable logic is desirable. PLD 90 can be used to perform a variety of different logic functions. For example, PLD 90 can be configured as a processor or controller that works in cooperation with processor 901. PLD 90 may also be used as an arbiter for arbitrating access to a shared resources in system 900. In yet another example, PLD 90 can be configured as an interface between processor 901 and one of the other components in system 900. It should be noted that system 900 is only exemplary, and that the true scope and spirit of the invention should be indicated by the following claims.

Various technologies can be used to implement PLDs 90 as described above and incorporating this invention.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. Circuitry for performing arithmetic operations on a plurality of inputs, said circuit comprising:
   at least first and second respective operator circuits, each of said at least first and second respective operator circuits operating on a respective subplurality of said plurality of inputs; and
   circuitry for selectively interconnecting said at least first and second respective operator circuits so that they can operate together or separately, according to user selection, on selected ones of (a) said full plurality of inputs, (b) individual ones of said respective subpluralities of said plurality of inputs, or (c) combinations of portions of said respective subpluralities of said plurality of inputs; wherein:
   at least one of said respective operator circuits includes circuits for simultaneously computing multiple different results and for selecting among said multiple different results based on an output of another one of said respective operator circuits;
   said multiple different results comprise sum, sum-plus-1 and sum-plus-2 results; and
   one or more of said multiple different results are selectably usable for both fixed-point operations and floating-point operations.

2. The circuitry for performing of claim 1 wherein:
   each of said respective operator circuits comprises a fixed-point adder circuit; and
   said circuitry for selectively interconnecting comprises control circuitry that receives inputs from two of said respective operator circuits, so that said two of said respective operator circuits provide a floating-point addition of portions of their respective subpluralities of said plurality of inputs.

3. The circuitry for performing of claim 2 further comprising at least one partial product generator; wherein:
   outputs of said at least one partial product generator are input to said two of said respective operator circuits provide a floating-point multiplication of inputs of said at least one partial product generator.

4. The circuitry for performing of claim 1 wherein said circuits for simultaneously computing comprise a half-adder and a prefix network tree.

5. The circuitry for performing of claim 4 wherein:
   said prefix network tree comprises first, second and third prefix networks;
   said first prefix network receives, as inputs, a first subset of outputs of said half-adder;
   said second prefix network receives, as inputs, a second subset of outputs of said half-adder; and
   said third prefix network receives, as inputs, outputs of said second prefix network and an output of a most significant node of said first prefix network.

6. The circuitry for performing of claim 5 wherein:
   input of said output of said most significant node of said first prefix network to said third prefix network is enabled; and
   output of said third prefix network is used to provide a combined sum of said first subset of outputs of said half-adder and said second subset of outputs of said half-adder, as well as a combined sum-plus-1 and a combined sum-plus-2.

7. The circuitry for performing of claim 5 wherein:
   input of said output of said most significant node of said first prefix network to said third prefix network is disabled; and
   output of said third prefix network is used to provide separate sums of said first subset of outputs of said half-adder and said second subset of outputs of said half-adder.

8. A specialized processing block on a programmable integrated circuit device, said specialized processing block comprising:
   at least one partial product generator providing a plurality of outputs;
   at least first and second respective adder circuits, each of said at least first and second respective adder circuits operating on a respective subplurality of said plurality of outputs; and
   circuitry for selectively interconnecting said at least first and second respective adder circuits so that they can operate together or separately, according to user selection, on selected ones of (a) said full plurality of outputs, (b) individual ones of said respective subpluralities of said plurality of outputs, or (c) combinations of portions of said respective subpluralities of said plurality of outputs; wherein:
   at least one of said respective adder circuits includes circuits for simultaneously computing multiple different results and for selecting among said multiple different results based on an output of another one of said respective adder circuits; and
   said multiple different results comprise sum, sum-plus-1 and sum-plus-2 results.

9. The specialized processing block of claim 8 wherein:
   each of said respective adder circuits comprises a fixed-point adder circuit; and
   said circuitry for selectively interconnecting comprises control circuitry that receives inputs from two of said respective adder circuits, so that said two of said respective operator circuits provide a floating-point addition of portions of their respective subpluralities of said plurality of outputs.

10. The specialized processing block of claim 8 wherein said circuits for simultaneously computing comprise a half-adder and a prefix network tree.

11. The specialized processing block of claim 10 wherein:
said prefix network tree comprises first, second and third prefix networks;
said first prefix network receives, as inputs, a first subset of outputs of said half-adder;
said second prefix network receives, as inputs, a second subset of outputs of said half-adder; and
said third prefix network receives, as inputs, outputs of said second prefix network and an output of a most significant node of said first prefix network.

12. The specialized processing block of claim 11 wherein:
input of said output of said most significant node of said first prefix network to said third prefix network is enabled; and
output of said third prefix network is used to provide a combined sum of said first subset of outputs of said half-adder and said second subset of outputs of said half-adder, as well as a combined sum-plus-1 and a combined sum-plus-2.

13. The specialized processing block of claim 11 wherein:
input of said output of said most significant node of said first prefix network to said third prefix network is disabled; and
output of said third prefix network is used to provide separate sums of said first subset of outputs of said half-adder and said second subset of outputs of said half-adder.

14. A programmable integrated circuit device comprising:
a plurality of specialized processing blocks, each of said specialized processing blocks comprising:
at least one partial product generator providing a plurality of outputs;
at least first and second respective adder circuits, each of said at least first and second respective adder circuits operating on a respective subplurality of said plurality of outputs; and
circuitry for selectively interconnecting said at least first and second respective adder circuits so that they can operate together or separately, according to user selection, on selected ones of (a) said full plurality of outputs, (b) individual ones of said respective subpluralities of said plurality of outputs, or (c) combinations of portions of said respective subpluralities of said plurality of outputs; wherein:
at least one of said respective adder circuits includes circuits for simultaneously computing multiple different results and for selecting among said multiple different results based on an output of another one of said respective adder circuits; and
said multiple different results comprise sum, sum-plus-1 and sum-plus-2 results.

15. The programmable integrated circuit device of claim 14 wherein:
each of said respective adder circuits comprises a fixed-point adder circuit; and
said circuitry for selectively interconnecting comprises control circuitry that receives inputs from two of said respective adder circuits, so that said two of said respective operator circuits provide a floating-point addition of portions of their respective subpluralities of said plurality of outputs.

16. The programmable integrated circuit device of claim 14 wherein said circuits for simultaneously computing comprise a half-adder and a prefix network tree.

17. The programmable integrated circuit device of claim 16 wherein:
said prefix network tree comprises first, second and third prefix networks;
said first prefix network receives, as inputs, a first subset of outputs of said half-adder;
said second prefix network receives, as inputs, a second subset of outputs of said half-adder; and
said third prefix network receives, as inputs, outputs of said second prefix network and an output of a most significant node of said first prefix network.

18. The programmable integrated circuit device of claim 17 wherein:
input of said output of said most significant node of said first prefix network to said third prefix network is enabled; and
output of said third prefix network is used to provide a combined sum of said first subset of outputs of said half-adder and said second subset of outputs of said half-adder, as well as a combined sum-plus-1 and a combined sum-plus-2.

19. The programmable integrated circuit device of claim 17 wherein:
input of said output of said most significant node of said first prefix network to said third prefix network is disabled; and
output of said third prefix network is used to provide separate sums of said first subset of outputs of said half-adder and said second subset of outputs of said half-adder.

* * * * *